Patented Aug. 30, 1938

2,128,819

UNITED STATES PATENT OFFICE 2,128,819

METHOD OF MELTING CYANIDES

Donald A. Holt, Niagara Falls, N. Y., assignor to E. I. du Pont de Nemours & Company, Wilmington, Del., a corporation of Delaware No Drawing. Application October 26, 1937, Serial No. 171,139

16 Claims. (Cl. 23—84)

This invention relates to a method of melting alkali metal cyanides and particularly to an improved method of melting said cyanides whereby decomposition of cyanide is greatly minimized.

Alkali metal cyanides, e. g. sodium cyanide, are generally marketed in various forms. Dry process cyanide in the molten condition is usually cast into forms of the desired shape, while wet process cyanide is usually pressed into briquettes. Wet process cyanide is seldom melted for casting purposes because cyanide losses due to decomposition are known to be appreciable. However, these same losses occur when such cyanide is fused during use, for example, in case hardening baths.

It is an object of my invention to provide an improved method of melting alkali metal cyanides, particularly such cyanides which are prepared by a wet process, whereby the decomposition which normally occurs when previously known methods of melting are employed is largely minimized. A further object is to provide a method of melting wet process alkali metal cyanide without substantial decomposition thereof. These and other objects will be apparent from the ensuing description of my invention.

The above objects may be accomplished in accordance with my invention by melting the cyanide under reduced pressure whereby gaseous or volatile oxidizing substances which were originally present in the cyanide or which are produced as a result of the heating are removed. I have discovered that the decomposition which normally occurs when wet process alkali metal cyanides are melted is due chiefly to the presence of oxidizing substances such as carbon monoxide, water, cyanates, formates, acetates, oxalates, carbon dioxide and bicarbonates. I have further discovered that by melting the cyanide under reduced pressure, e. g., a pressure not exceeding about 500 mm. of mercury, or by heating cyanide under such reduced pressure at a temperature which is effective in decomposing cyanates, formates and the like impurities and then continuing heating under an inert atmosphere, oxidizing gases which were initially present or were formed during the heating are effectively removed so that cyanide decomposition may be reduced to a minimum. In the latter modification of my invention, the application of vacuum until a temperature of 450–500° C. is reached, is preferred. However, excellent results may be obtained by changing from vacuum to an inert atmosphere at a temperature of about 300° C. A substantial reduction in cyanide decomposition may be obtained by carrying out the heating under reduced pressure at even lower temperatures, it being essential only that the vacuum treatment be at a temperature sufficiently high to decompose impurities such as cyanates, acetates, formates and the like.

The effectiveness of employing reduced pressure during the melting of alkali metal cyanides in accordance with my invention is illustrated by the following example in which wet process sodium cyanide was employed.

Example

A 2,000 gram charge of sodium cyanide in an iron container was placed in a furnace consisting of an iron pot provided with a cover bearing a thermocouple well and suitable valved connections to a source of vacuum. The charge was heated at such a rate that it was melted and a temperature of 800° C. reached in about 3 to 4 hours. During this time and for one hour thereafter, the pressure in the furnace was maintained at about 20–25 mm. Hg. The charge, still under vacuum, was then cooled rapidly after which air was admitted and the final material was weighed and analyzed. The original charge contained 90.05% sodium cyanide and the final product, which weighed 1,974 grams, analyzed 90.7% sodium cyanide. Therefore the loss of cyanide by decomposition amounted to 10.6 grams or only 0.58% of the original cyanide in the charge.

Repeated experiments have shown that the mere exclusion of oxygen of the air during the melting operation is not effective in reducing cyanide decomposition. Thus, the decomposition which results when the entire heating operation is conducted under an inert atmosphere of nitrogen is approximately 6% or greater as compared with a decomposition of 0.5% when the method of the above example is employed. It is, therefore, apparent that the practice of my process accomplishes an important saving of cyanide.

Although sodium cyanide melts at a temperature considerably below 800° C., it is generally the practice in cyanide casting operations to heat the melt to about 800° C. so that premature solidification will not result during casting. It is for this reason that the cyanide charges in the experiments described and referred to herein were heated to 800° C.

The maintenance of a good vacuum over a large charge of cyanide at high temperatures, e. g., 500° C. and higher, is difficult when practicing my process on a commercial scale. However, I have found that it is not necessary to employ a vacuum during the entire period of heating, so long as an inert atmosphere, e. g., an atmosphere of hydrogen or nitrogen, is maintained over the charge during the later stages of the melting operation. Thus, the charge may be heated under vacuum at a temperature sufficiently high to decompose impurities such as cyanates, formates, acetates and the like, after which melting may be carried out in a nitrogen atmosphere. By practicing this method and employing a vacuum corresponding to an absolute pressure of about 25 mm. Hg until a temperature of about 475° C. is reached, cyanide decomposition may be decreased to about the same extent as when vacuum is employed during the entire heating operation. When the vacuum is replaced by a nitrogen atmosphere at a temperature of about 380° C., cyanide losses are reduced to about 0.6 to 1.2%. While the replacement of vacuum by an inert atmosphere at a still lower temperature, which temperature is not lower than about 200° C., results in somewhat higher cyanide losses, such practice is effective in substantially reducing the losses that would normally occur if no vacuum were employed during the entire melting operation.

The use of an inert atmosphere in place of vacuum during the later stages of the melting operation does not substantially influence the extent of decomposition. It appears that the oxidizing substances which are responsible for the decomposition are effectively removed during the early stages of heating under vacuum. This is evident from measurements of the volume of gases evolved during the various stages of the heating operation as well as from the fact that once the cyanide is in the molten condition substantially no loss occurs thereafter, even though the melt is maintained at a temperature of 800° C. for a considerable period of time under the inert atmosphere.

Since the effect of employing a vacuum during the early stages is to remove as completely as possible gaseous oxidizing substances, it is preferable to employ as high a vacuum as may be obtained. However, my process is not limited to operations under any specific range of pressure since any reduction in the pressure below atmospheric pressure facilitates the removal of oxidizing gases and therefore is effective in minimizing decomposition. For example, cyanide decomposition is substantially reduced by operation at a pressure of 500 mm. Hg since under these conditions decomposition losses may be reduced to about 2.5%. At a pressure of 250 mm., the losses are reduced to about 1% and operation at a pressure of about 25 mm. or lower results in a loss of only about 0.5%.

It is to be understood that that embodiment of my invention wherein an inert atmosphere is employed during the later stages of the melting operation, is not restricted to the use of reduced pressure over a specific temperature range, since the temperature that need be employed during the vacuum treatment will vary to a considerable extent depending upon the impurities in the cyanide being melted, as well as upon the time during which the cyanide is subjected to the vacuum treatment. Cyanide decomposition will be substantially reduced as long as the temperature during the vacuum treatment is sufficiently high to decompose oxidizing impurities such as cyanates, formates, acetates and the like and effect removal of their undesirable decomposition products. In general, I prefer to employ a good vacuum until a temperature of 450–500° C. has been reached. Excellent results are also obtainable by employing a vacuum until a temperature of about 300° C. is reached and a substantial reduction in cyanide decomposition may be realized even when the vacuum is replaced by an inert atmosphere at a temperature of about 200° C.

The time during which the charge is heated under vacuum has a bearing upon the extent to which decomposition is minimized. This is evident from results obtained in a series of experiments wherein the time during which the cyanide was heated under vacuum to a temperature of about 380° C. was varied. By employing a vacuum corresponding to a pressure of about 25 mm. Hg for about two minutes the cyanide losses were about 1.2%. When the vacuum was employed for 15 minutes, the losses were reduced to about 0.77% and when vacuum was used for a period of two hours and fifteen minutes, the losses were reduced to about 0.54%. In my preferred method, I employ a good vacuum during the entire early stages of heating and find that it is sometimes desirable to subject the charge to a vacuum for a period of one hour or so prior to heating.

It appears that carbon monoxide is particularly effective in causing cyanide decomposition. The presence of carbon monoxide may result from the decomposition of impurities such as cyanates, formates and acetates in the charge and also by the reaction of carbon dioxide with carbon, the latter being generally present in small amounts.

In addition to a reduction in cyanide decomposition, my process is effective in reducing the amount of foaming that occurs during the melting operation. Also, the amount of carbon that is formed is generally in such a condition that it settles out at the bottom of the melt so as to leave a substantially white product above, which is desirable.

In view of my discovery of the effectiveness of the use of vacuum, it might be expected that an effective reduction in cyanide decomposition might be accomplished by sweeping the charge with an inert gas such as nitrogen or hydrogen in place of vacuum treatment. Experiments have shown, however, that operation under such conditions effects little, if any, reduction in cyanide decomposition. This is because it is practically impossible to effectively sweep the inert gas past each particle of cyanide so as to insure complete removal of oxidizing gases during the early stages of heating.

Alkali metal cyanides other than sodium cyanide may be melted in accordance with my invention with excellent results. Thus wet process potassium cyanide may be melted in the manner described above with substantially the same results as may be obtained with sodium cyanide. My method may also be practiced with good results in melting mixtures of cyanides or salt mixtures or compositions containing alkali metal cyanide. In the appended claims, I use the terms "alkali metal cyanide" and "sodium cyanide" to include such salt mixtures which contain an alkali metal cyanide and sodium cyanide, respectively.

In the foregoing, I have described and illustrated a preferred embodiment of my invention and various modifications thereof. It is to be understood that my invention is not to be limited by the description and procedural details set forth above which are intended to be illustrative

I claim:

1. The process comprising melting an alkali metal cyanide at a pressure substantially less than atmospheric pressure.

2. The process comprising melting sodium cyanide at a pressure substantially less than atmospheric pressure.

3. The process comprising melting an alkali metal cyanide at a pressure not exceeding about 500 mm. of mercury.

4. The process comprising melting sodium cyanide at a pressure not exceeding about 500 mm. of mercury.

5. The process comprising heating an alkali metal cyanide at a pressure substantially less than atmospheric pressure at a temperature sufficiently high to decompose oxidizing impurities contained in said cyanide, and thereafter melting said cyanide under an insert atmosphere.

6. The process comprising heating sodium cyanide at a pressure substantially less than atmospheric pressure at a temperature sufficiently high to decompose oxidizing impurities contained in said cyanide, and thereafter melting said cyanide under an inert atmosphere.

7. The process comprising heating an alkali metal cyanide at a pressure not exceeding about 500 mm. Hg and at a temperature sufficiently high to decompose oxidizing impurities contained in said cyanide, and thereafter melting said cyanide under an inert atmosphere.

8. The process comprising heating sodium cyanide at a pressure not exceeding about 500 mm. Hg and at a temperature sufficiently high to decompose oxidizing impurities contained in said cyanide, and thereafter melting said cyanide under an inert atmosphere.

9. The process comprising heating an alkali metal cyanide at a pressure substantially less than atmosphere pressure to a temperature of 200–500° C. and then continuing the application of heat under an inert atmosphere until said cyanide is melted.

10. The process comprising heating sodium cyanide at a pressure substantially less than atmospheric pressure to a temperature of 200–500° C. and then continuing the application of heat under an inert atmosphere until said cyanide is melted.

11. The process comprising heating an alkali metal cyanide at a pressure not exceeding about 500 mm. Hg to a temperature of 300–500° C. and then continuing the application of heat in an inert atmosphere until said cyanide is melted.

12. The process comprising heating sodium cyanide at a pressure not exceeding about 500 mm. Hg to a temperature of 300–500° C. and then continuing the application of heat in an inert atmosphere until said cyanide is melted.

13. The process comprising heating an alkali metal cyanide at a pressure not exceeding about 250 mm. Hg to a temperature of 300–500° C. and then continuing the application of heat in an inert atmosphere until said cyanide is melted.

14. The process comprising heating sodium cyanide at a pressure not exceeding about 250 mm. Hg to a temperature of 300–500° C. and then continuing the application of heat in an inert atmosphere until said cyanide is melted.

15. The process comprising heating an alkali metal cyanide at a pressure not exceeding about 250 mm. Hg to a temperature of about 450–500° C. and then continuing the application of heat until said cyanide is melted.

16. The process comprising heating sodium cyanide at a pressure not exceeding about 250 mm. Hg to a temperature of about 450–500° C. and then continuing the application of heat until said cyanide is melted.

DONALD A. HOLT.